(12) United States Patent
Hill et al.

(10) Patent No.: US 8,463,492 B2
(45) Date of Patent: Jun. 11, 2013

(54) EFFICIENT AC OPERATION USING DEW-POINT TEMPERATURE

(75) Inventors: Mark A. Hill, St. Clair, MI (US); Alfred Jeckel, Bloomfield, MI (US); Curt O'Donnell, Grand Blanc, MI (US); Mark Bigler, Gaines, MI (US); Holgar Krah, West Bloomfield, MI (US); Lance Tagliapietra, Winona, MN (US)

(73) Assignee: Chrysler Group LLC, Auburn Hills, MI (US)

( * ) Notice: Subject to any disclaimer, the term of this patent is extended or adjusted under 35 U.S.C. 154(b) by 453 days.

(21) Appl. No.: 12/471,518

(22) Filed: May 26, 2009

(65) Prior Publication Data

US 2009/0299529 A1 Dec. 3, 2009

Related U.S. Application Data

(60) Provisional application No. 61/056,469, filed on May 28, 2008.

(51) Int. Cl.
*G06F 7/00* (2006.01)

(52) U.S. Cl.
USPC .................. 701/36; 700/278; 236/44 C

(58) Field of Classification Search
USPC ............... 423/574.1, 224, 576; 422/200–201; 518/712; 60/648, 775; 701/36; 700/278; 236/91 R, 91 C, 91 D, 91 F, 44 R, 44 C
See application file for complete search history.

(56) References Cited

U.S. PATENT DOCUMENTS 5,701,752 A * 12/1997 Tsunokawa et al. ............ 62/183
2006/0207325 A1 * 9/2006 Kataoka et al. ............ 73/335.01

* cited by examiner

*Primary Examiner* — Thomas Black
*Assistant Examiner* — Luke Huynh
(74) *Attorney, Agent, or Firm* — Ralph Edwin Smith

(57) ABSTRACT

A system for controlling air-conditioning in a vehicle includes an input, a sensor, a first offset module, and an evaporator temperature control module. The input receives an input temperature. The first sensor measures a first dewpoint temperature of air adjacent to a windshield of the vehicle. The first offset module generates a second dewpoint temperature based on the input temperature and generates a first offset based on the first and second dewpoint temperatures. The evaporator temperature control module generates a target evaporator temperature based on the first offset.

20 Claims, 16 Drawing Sheets

| Ambient Temp (F) | Evap Temp High (F) | Evap Temp Low (F) |
|---|---|---|
| 30 | 38 | 38 |
| 40 | 38 | 38 |
| 50 | 48 | 38 |
| 60 | 52 | 38 |
| 61 | 52 | 38 |
| 70 | 52 | 38 |
| 80 | 52 | 38 |
| 90 | 52 | 38 |
| 100 | 52 | 38 |
| 110 | 52 | 38 |

FIG. 2C

RH @ Nose Tip =

| Customer Set Temp | | 45% | 45% | 46% | 47% | 48% | 49% | 50% | 50% | 51% | 52% | 53% | 54% | 55% | 55% |
|---|---|---|---|---|---|---|---|---|---|---|---|---|---|---|---|
| Temp [°F] | Temp [°C] | Dewpoint [°C] | Dewpoint [°F] | Dewpoint [°C] | Dewpoint [°C] | Dewpoint [°C] | Dewpoint [°C] | Dewpoint [°C] | Dewpoint [°F] | Dewpoint [°C] | Dewpoint [°C] | Dewpoint [°C] | Dewpoint [°C] | Dewpoint [°C] | Dewpoint [°F] |
| 86.0 | 30.0 | 16.8 | 62.2 | 17.1 | 17.5 | 17.8 | 18.1 | 18.4 | 65.2 | 18.8 | 19.1 | 19.4 | 19.7 | 20.0 | 67.9 |
| 85.0 | 29.4 | 16.3 | 61.3 | 16.6 | 16.9 | 17.3 | 17.6 | 17.9 | 64.3 | 18.2 | 18.6 | 18.9 | 19.2 | 19.5 | 67.0 |
| 84.0 | 28.9 | 15.8 | 60.4 | 16.1 | 16.4 | 16.8 | 17.1 | 17.4 | 63.4 | 17.7 | 18.0 | 18.3 | 18.6 | 18.9 | 66.1 |
| 83.0 | 28.3 | 15.3 | 59.5 | 15.6 | 15.9 | 16.3 | 16.6 | 16.9 | 62.4 | 17.2 | 17.5 | 17.8 | 18.1 | 18.4 | 65.2 |
| 82.0 | 27.8 | 14.8 | 58.6 | 15.1 | 15.4 | 15.8 | 16.1 | 16.4 | 61.5 | 16.7 | 17.0 | 17.3 | 17.6 | 17.9 | 64.2 |
| 81.0 | 27.2 | 14.3 | 57.7 | 14.6 | 14.9 | 15.3 | 15.6 | 15.9 | 60.6 | 16.2 | 16.5 | 16.8 | 17.1 | 17.4 | 63.3 |
| 80.0 | 26.7 | 13.8 | 56.8 | 14.1 | 14.4 | 14.8 | 15.1 | 15.4 | 59.7 | 15.7 | 16.0 | 16.3 | 16.6 | 16.9 | 62.4 |
| 79.0 | 26.1 | 13.3 | 55.9 | 13.6 | 13.9 | 14.2 | 14.6 | 14.9 | 58.8 | 15.2 | 15.5 | 15.8 | 16.1 | 16.4 | 61.5 |
| 78.0 | 25.6 | 12.7 | 54.9 | 13.1 | 13.4 | 13.7 | 14.1 | 14.4 | 57.9 | 14.7 | 15.0 | 15.3 | 15.6 | 15.8 | 60.5 |
| 77.0 | 25.0 | 12.2 | 54.0 | 12.6 | 12.9 | 13.2 | 13.5 | 13.9 | 56.9 | 14.2 | 14.5 | 14.8 | 15.0 | 15.3 | 59.6 |
| 76.0 | 24.4 | 11.7 | 53.1 | 12.1 | 12.4 | 12.7 | 13.0 | 13.3 | 56.0 | 13.7 | 14.0 | 14.2 | 14.5 | 14.8 | 58.7 |
| 75.0 | 23.9 | 11.2 | 52.2 | 11.6 | 11.9 | 12.2 | 12.5 | 12.8 | 55.1 | 13.1 | 13.4 | 13.7 | 14.0 | 14.3 | 57.7 |
| 74.0 | 23.3 | 10.7 | 51.3 | 11.1 | 11.4 | 11.7 | 12.0 | 12.3 | 54.2 | 12.6 | 12.9 | 13.2 | 13.5 | 13.8 | 56.8 |
| 73.0 | 22.8 | 10.2 | 50.4 | 10.6 | 10.9 | 11.2 | 11.5 | 11.8 | 53.3 | 12.1 | 12.4 | 12.7 | 13.0 | 13.3 | 55.9 |
| 72.0 | 22.2 | 9.7 | 49.5 | 10.1 | 10.4 | 10.7 | 11.0 | 11.3 | 52.4 | 11.6 | 11.9 | 12.2 | 12.5 | 12.8 | 55.0 |
| 71.0 | 21.7 | 9.2 | 48.6 | 9.6 | 9.9 | 10.2 | 10.5 | 10.8 | 51.4 | 11.1 | 11.4 | 11.7 | 12.0 | 12.2 | 54.0 |
| 70.0 | 21.1 | 8.7 | 47.7 | 9.0 | 9.4 | 9.7 | 10.0 | 10.3 | 50.5 | 10.6 | 10.9 | 11.2 | 11.4 | 11.7 | 53.1 |
| 69.0 | 20.6 | 8.2 | 46.8 | 8.5 | 8.9 | 9.2 | 9.5 | 9.8 | 49.6 | 10.1 | 10.4 | 10.7 | 10.9 | 11.2 | 52.2 |
| 68.0 | 20.0 | 7.7 | 45.9 | 8.0 | 8.4 | 8.7 | 9.0 | 9.3 | 48.7 | 9.6 | 9.9 | 10.1 | 10.4 | 10.7 | 51.2 |
| 67.0 | 19.4 | 7.2 | 45.0 | 7.5 | 7.8 | 8.2 | 8.5 | 8.8 | 47.8 | 9.1 | 9.3 | 9.6 | 9.9 | 10.2 | 50.3 |
| 66.0 | 18.9 | 6.7 | 44.1 | 7.0 | 7.3 | 7.6 | 8.0 | 8.2 | 46.8 | 8.5 | 8.8 | 9.1 | 9.4 | 9.7 | 49.4 |
| 65.0 | 18.3 | 6.2 | 43.2 | 6.5 | 6.8 | 7.1 | 7.4 | 7.7 | 45.9 | 8.0 | 8.3 | 8.6 | 8.9 | 9.1 | 48.5 |
| 64.0 | 17.8 | 5.7 | 42.3 | 6.0 | 6.3 | 6.6 | 6.9 | 7.2 | 45.0 | 7.5 | 7.8 | 8.1 | 8.4 | 8.6 | 47.5 |
| 63.0 | 17.2 | 5.2 | 41.4 | 5.5 | 5.8 | 6.1 | 6.4 | 6.7 | 44.1 | 7.0 | 7.3 | 7.6 | 7.8 | 8.1 | 46.6 |
| 62.0 | 16.7 | 4.7 | 40.4 | 5.0 | 5.3 | 5.6 | 5.9 | 6.2 | 43.2 | 6.5 | 6.8 | 7.1 | 7.3 | 7.6 | 45.7 |
| 61.0 | 16.1 | 4.2 | 39.5 | 4.5 | 4.8 | 5.1 | 5.4 | 5.7 | 42.3 | 6.0 | 6.3 | 6.5 | 6.8 | 7.1 | 44.7 |
| 60.0 | 15.6 | 3.7 | 38.6 | 4.0 | 4.3 | 4.6 | 4.9 | 5.2 | 41.3 | 5.5 | 5.7 | 6.0 | 6.3 | 6.6 | 43.8 |
| 59.0 | 15.0 | 3.2 | 37.7 | 3.5 | 3.8 | 4.1 | 4.4 | 4.7 | 40.4 | 5.0 | 5.2 | 5.5 | 5.8 | 6.0 | 42.9 |

FIG. 3A

| User Dewpoint Offset Table (50% RH) | |
|---|---|
| User Dewpoint Diff. | User Dewpoint Offset |
| 0 | 0 |
| 10 | 1 |
| 20 | 2 |
| 25 | 3 |
| 30 | 4 |
| 35 | 8 |

FIG. 3C

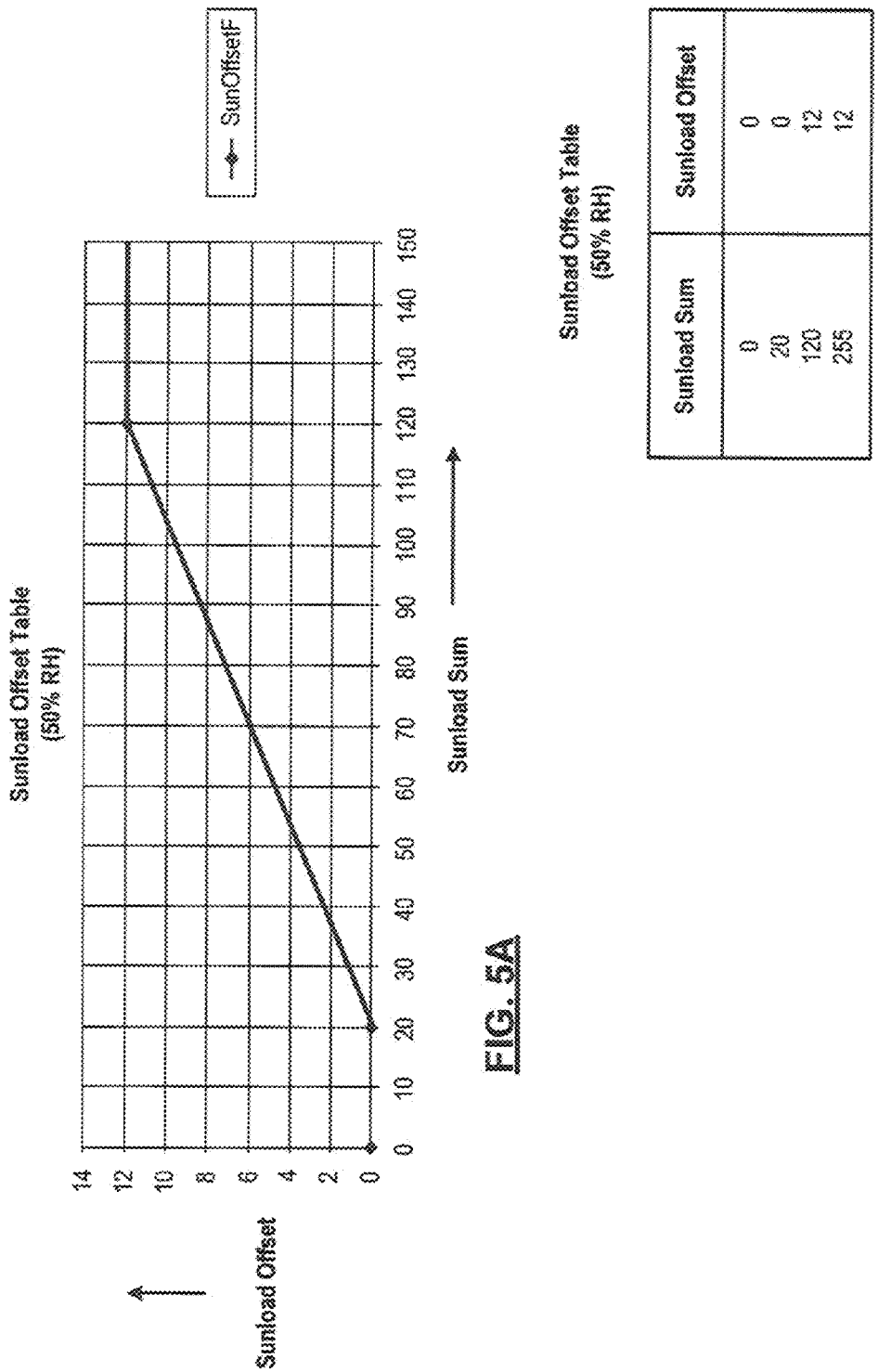

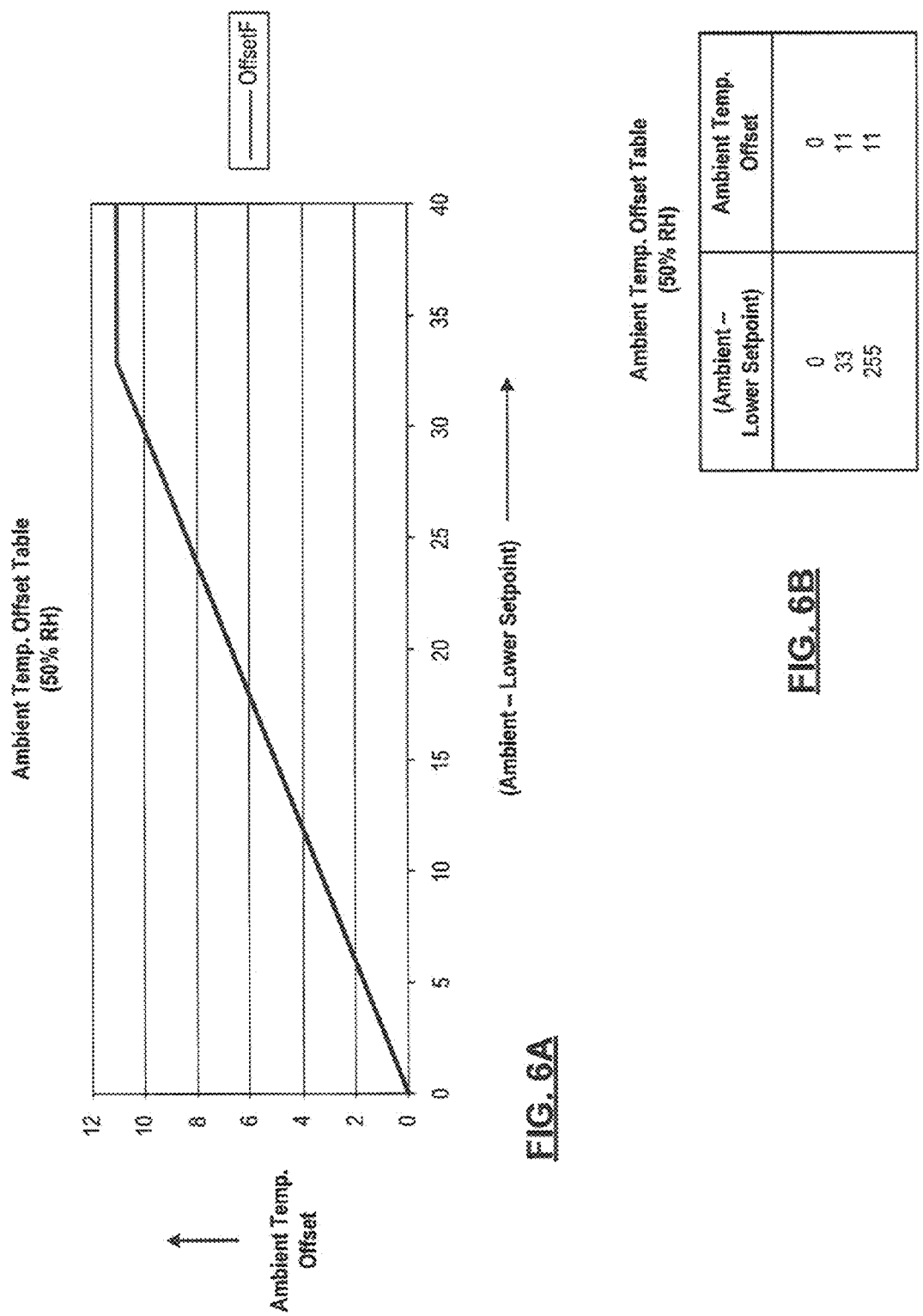

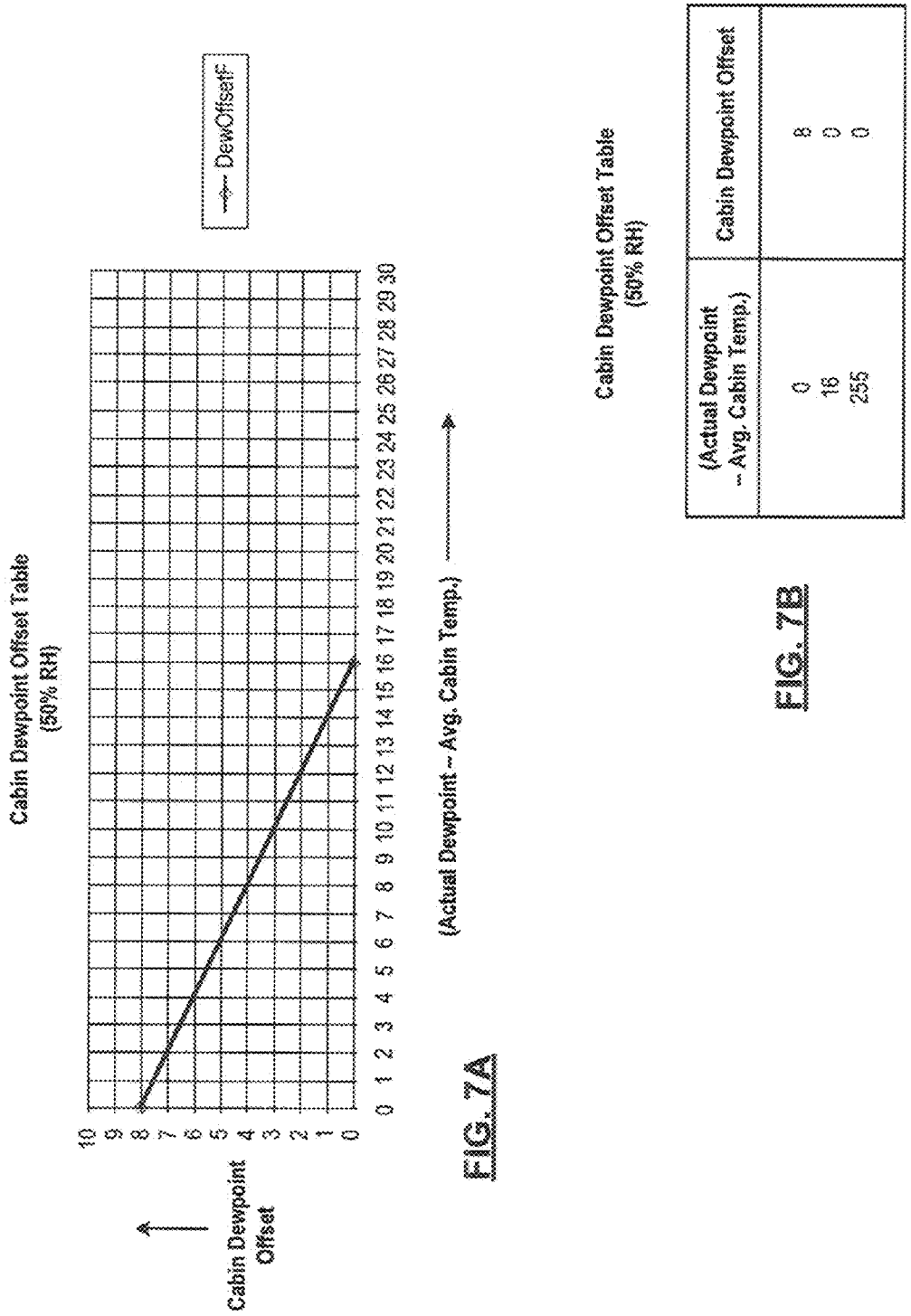

EFFICIENT AC OPERATION USING DEW-POINT TEMPERATURE

CROSS REFERENCE TO RELATED APPLICATION

This application claims the benefit of U.S. Provisional Application 61/056,469 filed May 28, 2008.

FIELD OF THE INVENTION

The present invention relates to vehicle air-conditioning (AC) systems, and more particularly to systems and methods for efficient operation of vehicle AC systems using dew-point temperature.

BACKGROUND OF THE INVENTION

Referring now to FIGS. 1A and 1B, different temperature control systems used in vehicles to control cabin temperature are shown. In FIG. 1A, a manual temperature control (MTC) system 10 is shown. The MTC system 10 comprises user controls 12, an air-conditioning (AC) control module 14, a compressor 16, a blower 17, and an evaporator 18.

An occupant uses user controls 12 to manually set and adjust the cabin temperature. For example, the occupant can set a desired cabin temperature, adjust a speed of the blower 17, and/or turn the AC on or off. The AC control module 14 controls the compressor 16 based on the settings input by the occupant and by sensing the temperature of the evaporator 18. When the user turns the blower 17 on, the blower 17 blows fresh air from outside the vehicle into the cabin or recirculates the air in the cabin depending on an airflow mode selected by the user.

In FIG. 1B, an automatic temperature control (ATC) system 20 is shown. The ATC system 20 comprises the user controls 12, an AC control module 22, the compressor 16, the blower 17 and the evaporator 18.

The occupant initially sets the desired cabin temperature. Thereafter, the ATC system 20 automatically maintains the desired cabin temperature based on inputs received from interior and exterior of the cabin and by sensing the temperature of the evaporator 18. Additionally, the AC control module 22 controls the blower 17 and selects the airflow mode. When the AC control module 22 turns the blower 17 on, the blower 17 blows fresh air from outside the vehicle into the cabin or recirculates the cabin air depending on the airflow mode selected.

Typically, the ATC system 20 maintains the desired cabin temperature by turning the compressor 16 on and by maintaining an evaporator temperature at a low value (e.g., 35 F to 38 F). When the evaporator temperature is maintained at the low value, however, the compressor 16 is turned on at all times. Consequently, the ATC system 20 increases energy consumption and decreases fuel efficiency of the vehicle.

SUMMARY OF THE INVENTION

A system for controlling air-conditioning of a vehicle controls a compressor by operating an evaporator in a predetermined temperature range. The system includes an input, a plurality of sensors, an offset module, an evaporator temperature control module, and an air-conditioning (AC) control module.

The input receives an input temperature desired by an occupant. The sensors measure a plurality of parameters including a first dewpoint temperature of air adjacent to a windshield measured by a first sensor. The offset module generates a second dewpoint temperature based on the input temperature and generates a first offset based on the first and second dewpoint temperatures. Additionally, the offset module generates a plurality of offsets based on outputs generated by the sensors. The evaporator temperature control module generates a target evaporator temperature based on a predetermined evaporator temperature and the offsets.

The AC control module controls at least one of a compressor, a blower, and a mode of airflow inside the vehicle based on the target evaporator temperature. The AC control module turns the compressor on until the evaporator reaches the target evaporator temperature. The AC control module turns the compressor off when a sum of the offsets is zero.

The system further includes a fog control module that communicates with the AC control module and the evaporator temperature control module. The fog control module controls defogging of the windshield based on a difference between the first dewpoint temperature and a glass temperature of the windshield measured by the first sensor.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2C is an exemplary table showing points of the graph of FIG. 2B according to the present invention;

FIG. 3A is a table showing dewpoint temperatures corresponding to different desired temperatures at different percentages of relative humidity;

FIG. 3C is an exemplary user dewpoint offset table showing points of the graph of FIG. 3B according to the present invention;

FIG. 5A is an exemplary graph of sunload offset versus sunload sum according to the present invention;

FIG. 5B is an exemplary sunload offset table showing points of the graph of FIG. 5A according to the present invention;

FIG. 6A is an exemplary graph of ambient temperature offset versus a difference between ambient and setpoint temperatures according to the present invention;

FIG. 6B is an exemplary ambient temperature offset table showing points of the graph of FIG. 6A according to the present invention;

FIG. 7A is an exemplary graph of cabin dewpoint offset versus a difference between actual dewpoint and average cabin temperature according to the present invention;

FIG. 7B is an exemplary cabin dewpoint offset table showing points of the graph of FIG. 7A according to the present invention;

DETAILED DESCRIPTION

The present invention discloses an ATC system that maintains the desired cabin temperature by maintaining the evaporator temperature at a highest possible value at which occupants feel comfortable. Additionally, the compressor 16 can be turned off by determining when running the compressor 16 is unnecessary to maintain the desired cabin temperature.

Specifically, instead of maintaining the evaporator temperature at a predetermined low value, the evaporator 18 is operated within a predetermined or targeted temperature range. A target evaporator temperature is determined based on a plurality of inputs. The inputs include psychrometric parameters of the air inside the cabin. For example, the inputs include a dewpoint temperature of the air inside the cabin. The psychrometric parameters are measured by psychrometric sensors. For example, the dewpoint temperature is accurately measured (i.e., not estimated) by a combination humidity sensor mounted adjacent to a windshield of the vehicle (e.g., at a base of a rear view mirror). The compressor 16 is turned on only until the temperature of the evaporator 18 reaches the target evaporator temperature. Thereafter, the compressor 16 is turned off.

Figure 1A:
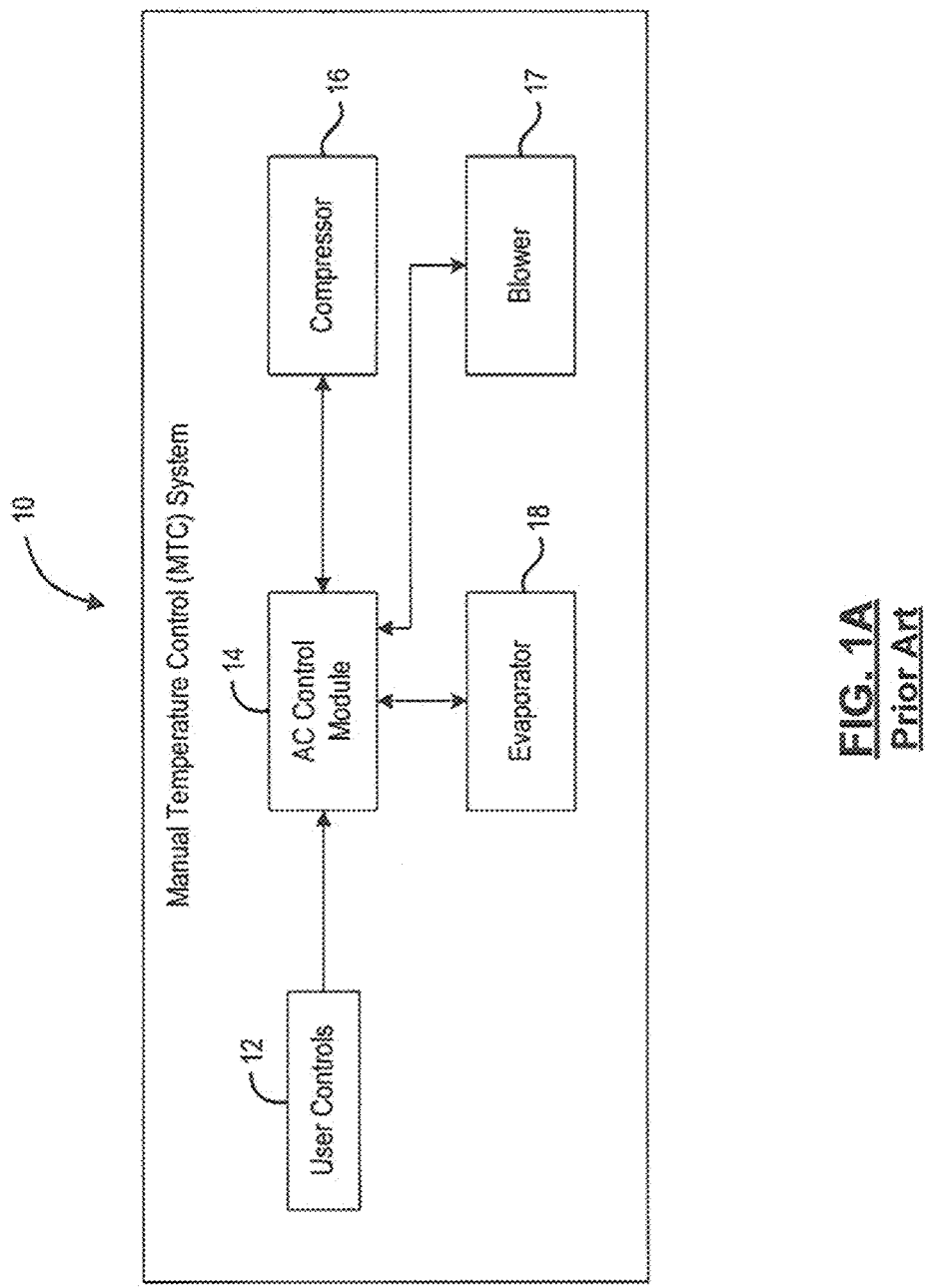
FIG. 1A is a functional block diagram of an exemplary manual temperature control system according to the prior art.
Figure 1B:
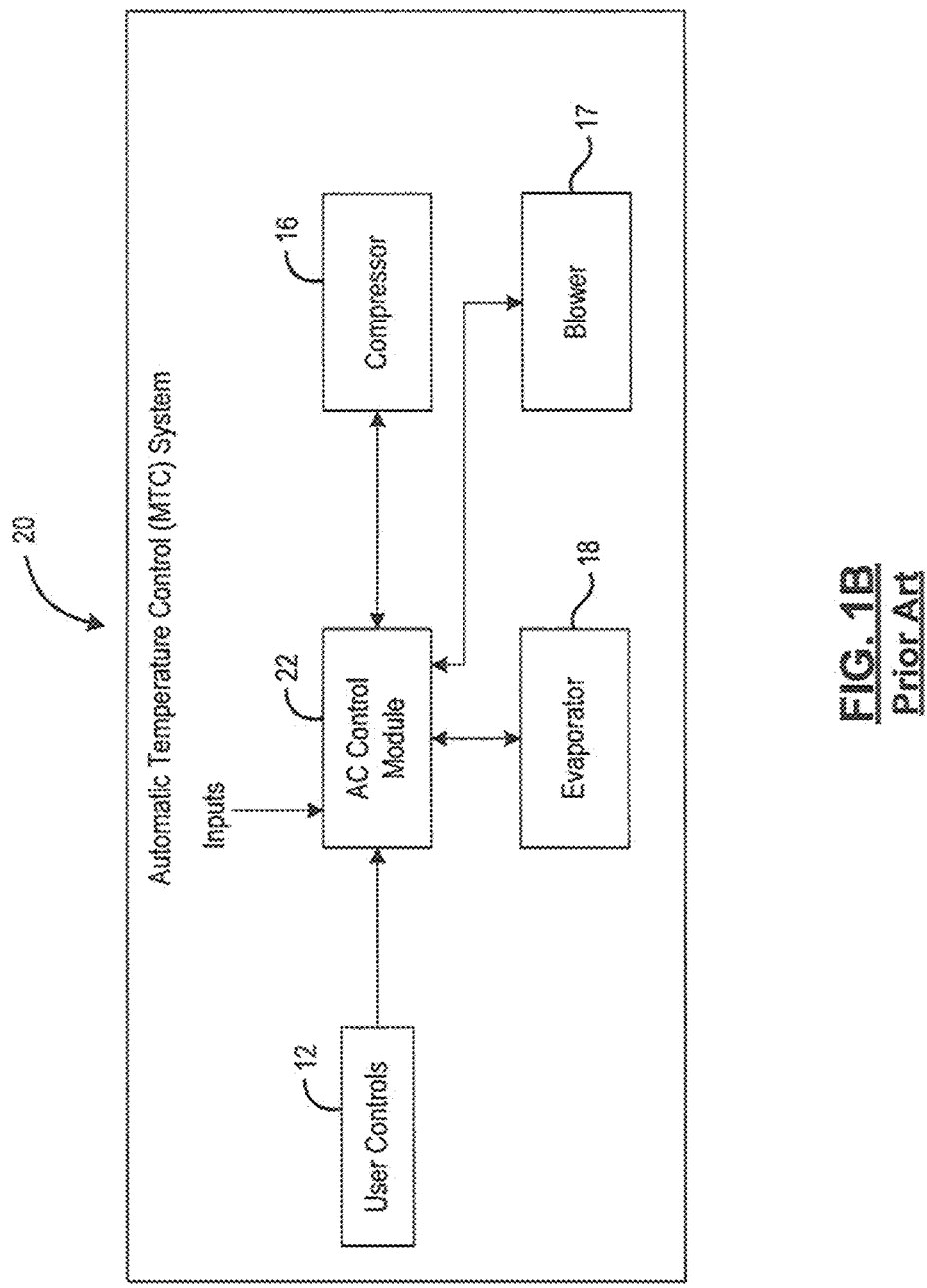
FIG. 1B is a functional block diagram of an exemplary automatic temperature control system according to the prior art.
Figure 2A:
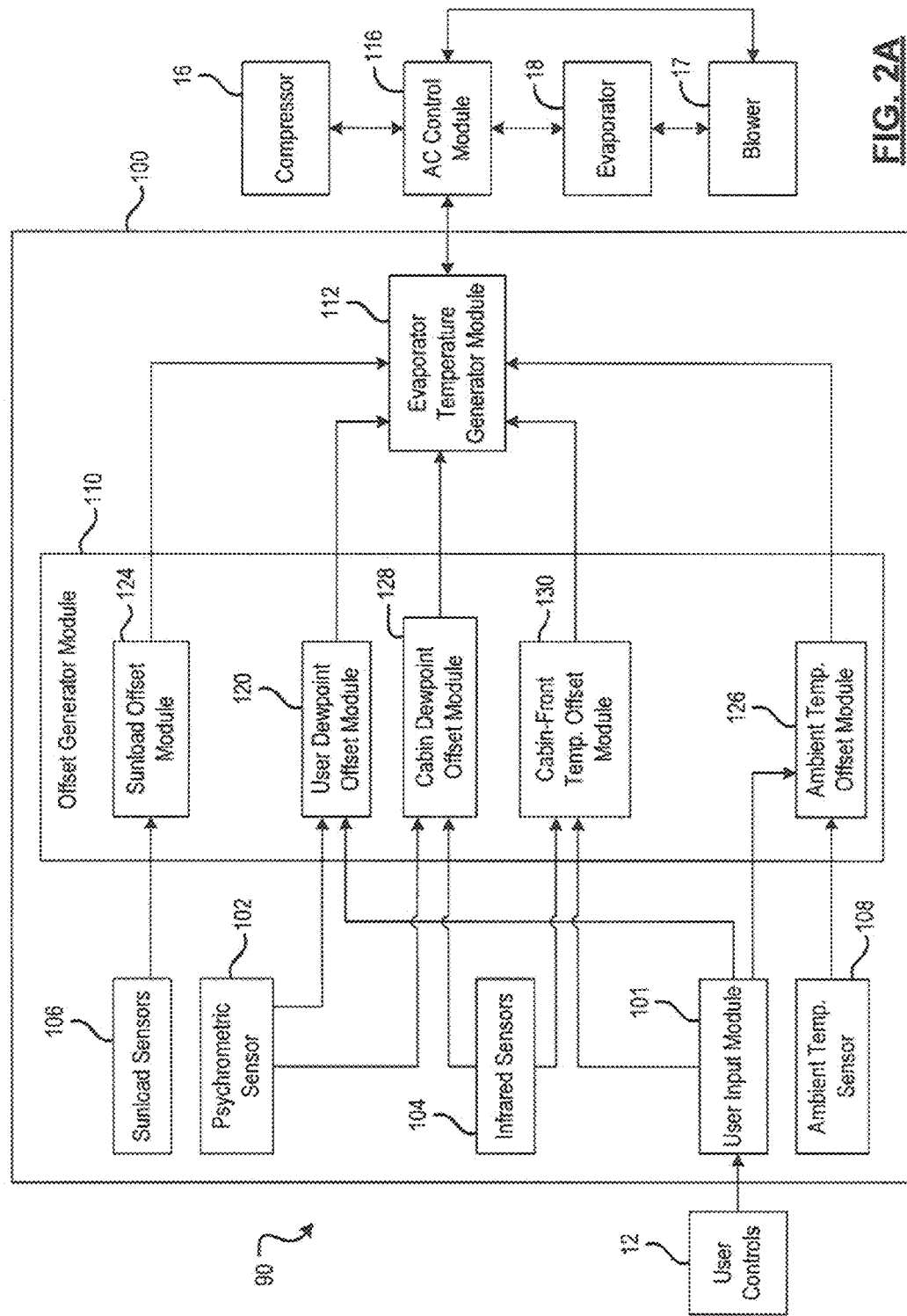
FIG. 2A is a functional block diagram of an exemplary automatic temperature control system according to the present invention.
Figure 2B:
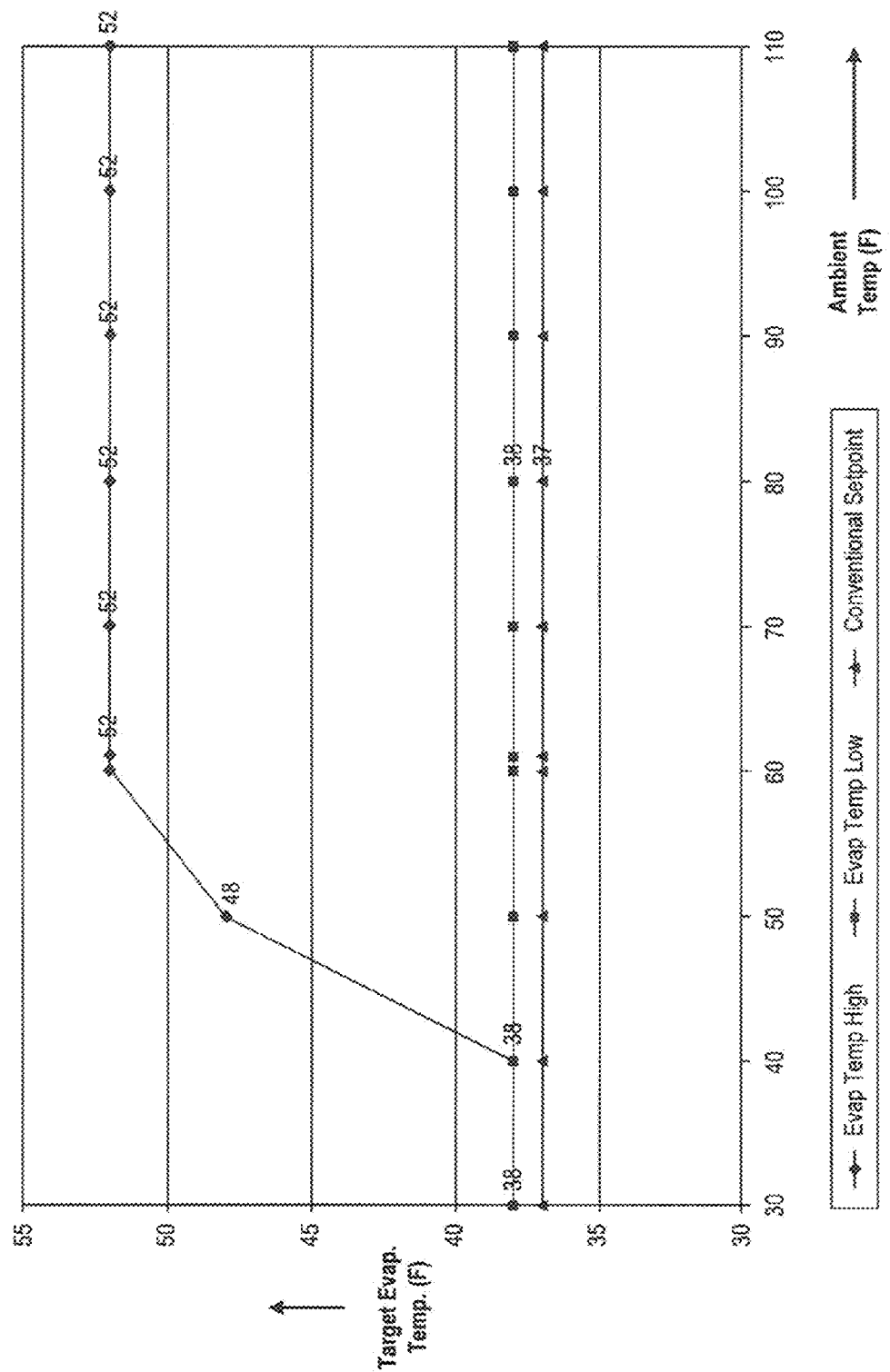
FIG. 2B is an exemplary graph of target evaporator temperature versus ambient temperature according to the present invention.

Referring now to FIGS. 2A-2C, an ATC system 90 according to the present invention is shown. In FIG. 2A, the ATC system 90 comprises the user controls 12, an evaporator control system 100, an AC control module 116, the compressor 16, the blower 17, and the evaporator 18. The evaporator control system 100 generates the target evaporator temperature. The AC control module 116 controls the compressor 16 based on the target evaporator temperature. Additionally, the AC control module 116 controls the blower 17.

The evaporator control system 100 comprises a user input module 101, a psychrometric sensor 102, infrared sensors 104, sunload sensors 106, an ambient temperature sensor 108, an offset generator module 110, and an evaporator temperature generator module 112. As an example, the psychrometric sensor 102 includes a combination humidity sensor 102. As an example, the offset generator module 110 comprises a user dewpoint offset module 120, a sunload offset module 124, an ambient temperature offset module 126, a cabin dewpoint offset module 128, and a cabin-front temperature offset module 130. The offset generator module 110 can include fewer or additional offset modules.

The user input module 101 receives inputs from occupants via the user controls 12. The sensors sense respective parameters and generate output signals. The offset generator module 110 generates one or more offsets based on the inputs received by the user input module 101 and the output signals received from the sensors. The evaporator temperature generator module 112 generates the target evaporator temperature for the evaporator 18 based on one or more of the offsets.

The AC control module 116 senses the temperature of the evaporator 18, turns the compressor 16 on, and controls the speed of the compressor 16 until the temperature of the evaporator 18 reaches the target evaporator temperature. The AC control module 116 turns the compressor 16 off when the temperature of the evaporator 18 is substantially equal to the target evaporator temperature (i.e., when a sum of the offsets is zero). Additionally, the AC control module 116 senses and controls the speed of the blower 17 and selects the airflow mode.

Specifically, the evaporator temperature generator module 112 generates the target evaporator temperature during each proportional integral derivative (PID) control loop of the compressor 16. The evaporator temperature generator module 112 generates the target evaporator temperature by subtracting one or more offsets from a predetermined evaporator temperature. As an example, the target evaporator temperature ranges between a maximum of 52 F and a minimum of 38 F. An exemplary graph of the target evaporator temperature versus ambient temperature is shown in FIG. 2B, and a table corresponding to the graph is shown in FIG. 2C.

More specifically, the user input module 101 receives one or more desired temperature settings set by one or more occupants (e.g., a driver and a front passenger) of the vehicle using user controls 12. The temperature settings are hereinafter referred to as driver and passenger setpoints (collectively setpoints). The input module 101 generates output signals indicating the driver and passenger setpoints.

The combination humidity sensor 102 measures a windshield glass temperature, a windshield air temperature, and a relative humidity (RH) of the air proximate to the combination humidity sensor 102. The combination humidity sensor 102 calculates the dewpoint temperature of the air proximate to the combination humidity sensor 102 (hereinafter actual dewpoint or measured dewpoint) based on the windshield glass temperature, the windshield air temperature, and the RH of the air. The combination humidity sensor 102 generates output signals indicating the windshield glass temperature, the windshield air temperature, the RH, and the actual dewpoint.

The infrared sensors 104 are mounted at various locations inside the cabin (e.g., in driver, passenger, and/or rear area of the cabin). The infrared sensors 104 sense the temperature of the air inside the cabin and generate output signals indicating the temperature of the air on the driver and passenger sides of the cabin.

One or more sunload sensors 106 are mounted on a dashboard of the vehicle (e.g., one on driver side and another on passenger side). The sunload sensors 106 measure sunload on the dashboard by sensing solar radiation. The sunload sensors 106 generate output signals indicating the sunload on the driver and passenger sides of the dashboard.

The ambient temperature sensor 108 senses the ambient temperature outside the vehicle. The ambient temperature sensor 108 generates an output signal indicating the ambient temperature.

On receiving the output signals generated by the input module 101 and the sensors, the offset generator module 110 generates one or more offsets. Specifically, the user dewpoint offset module 120 generates a user dewpoint offset. The sunload offset module 124 generates a sunload offset. The ambient temperature offset module 126 generates the ambient temperature offset. The cabin dewpoint offset module 128 generates a cabin dewpoint offset. The cabin-front temperature offset module 130 generates a cabin-front temperature offset. A description of each offset follows.

Figure 3B:
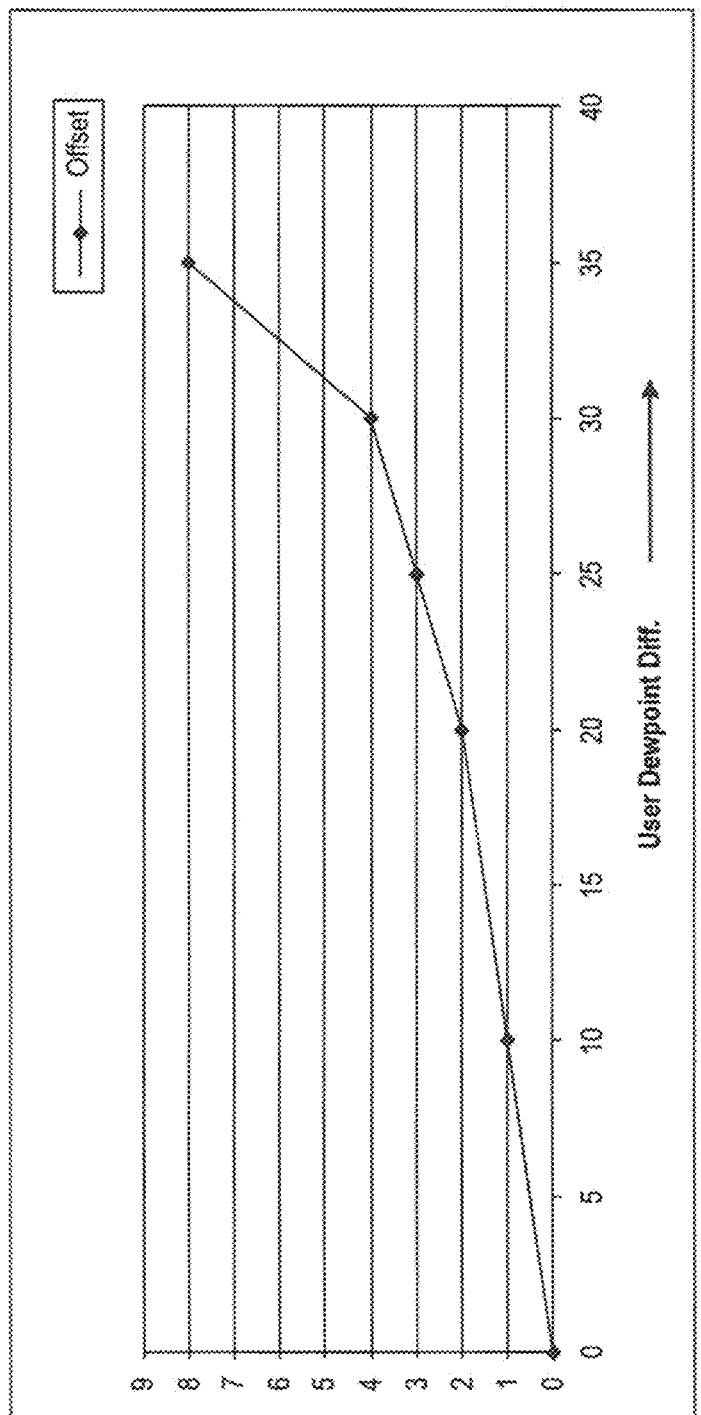
FIG. 3B is an exemplary graph of user dewpoint offset versus user dewpoint difference according to the present invention.

Referring now to FIGS. 3A-3C, the user dewpoint offset module 120 generates the user dewpoint offset as follows. In FIG. 3A, a temperature table is shown. The temperature table shows dewpoint temperatures corresponding to different setpoints at different percentages of RH according to American Society of Heating, Refrigerating and Air-Conditioning Engineers (ASHRAE) standards.

For example, when 50% RH is desired (since humans are generally comfortable when the RH is between 45% and 55%), the dewpoint temperature corresponding to a setpoint of 70 F is 50.5 F. The dewpoint temperature 50.5 F is referred to as a target dewpoint for the setpoint of 70 F at 50% RH. The user dewpoint offset module 120 includes memory and stores the temperature table in memory. When used, the user dewpoint offset module 120 receives the output signals generated by the user input module 101 indicating the driver and passenger setpoints. The user dewpoint offset module 120 generates the target dewpoint corresponding to a lower of the driver and passenger setpoints at a predetermined RH (e.g., 50%) based on the temperature table.

Additionally, the user dewpoint offset module 120 receives the output signal generated by the combination humidity sensor 102 indicating the actual dewpoint. The user dewpoint offset module 120 generates a difference between the target and actual dewpoints. The difference is called a user dewpoint difference.

The user dewpoint offset module 120 stores a user dewpoint offset table for a predetermined RH in memory. An exemplary user dewpoint offset table for 50% RH is shown in the form of a graph of user dewpoint offset versus the user dewpoint difference in FIG. 3B and in a corresponding table in FIG. 3C. The user dewpoint offset module 120 generates the user dewpoint offset corresponding to the user dewpoint difference based on the user dewpoint offset table. The user dewpoint offset module 120 generates an output signal indicating the user dewpoint offset.

Figure 4:
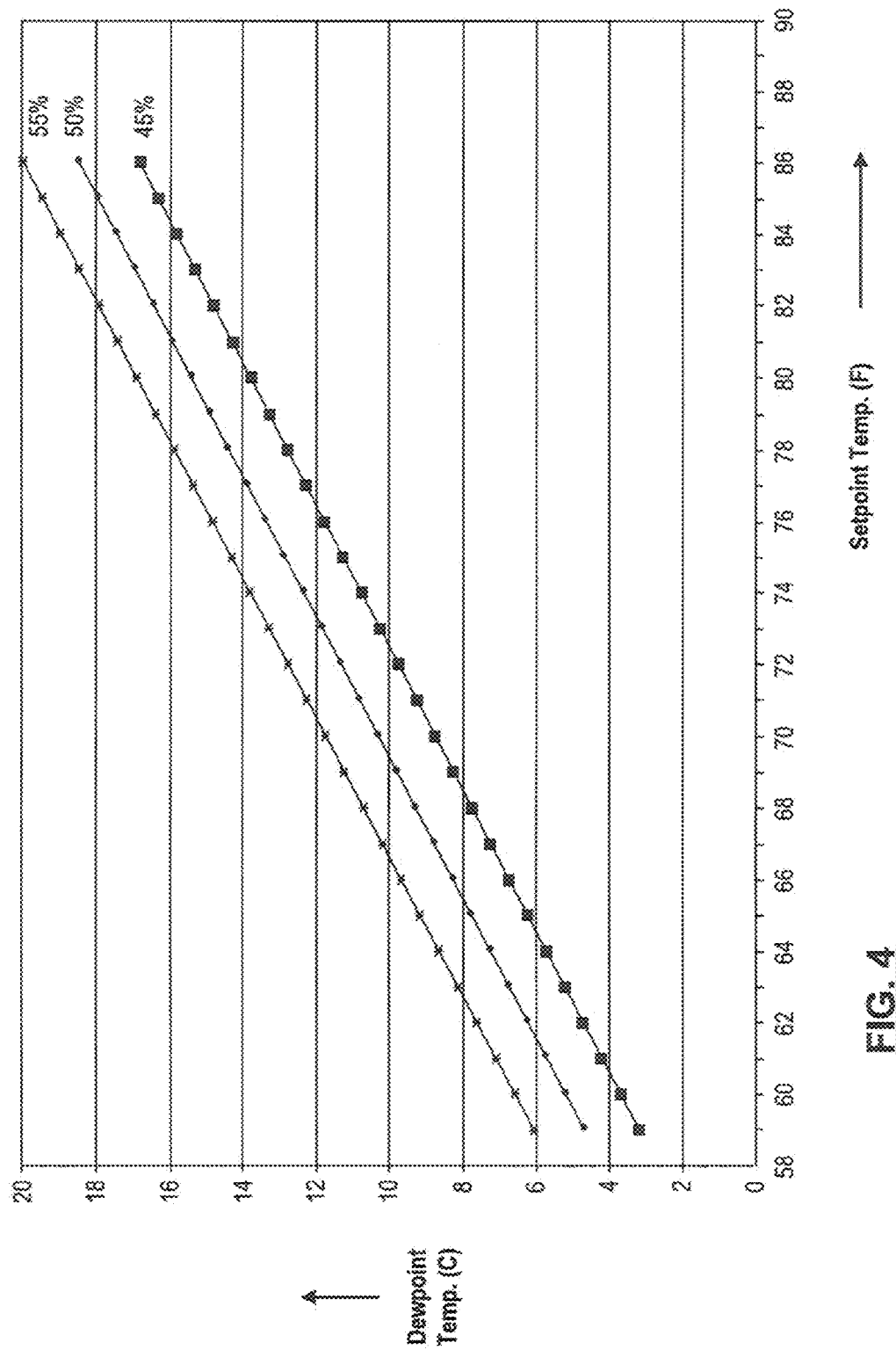
FIG. 4 is a graph of dewpoint temperature versus desired temperature (i.e., setpoint temperature). at different percentages of relative humidity.

Referring now to FIG. 4, the user dewpoint offset module 120 can store multiple user dewpoint offset tables. For example, the user dewpoint offset module 120 can store user dewpoint offset tables for 45%, 50%, and 55% RH. The user dewpoint offset module 120 can generate the user dewpoint offset for any RH between 45% and 55%. Accordingly, the evaporator temperature generator module 112 can generate different target evaporator temperatures corresponding to different values of RH. The evaporator temperature generator module 112 can receive feedback from the AC control module 116. Based on the feedback, the evaporator temperature generator module 112 can select the RH at which the compressor 16 operates most efficiently.

Referring now to FIGS. 5A and 5B, the sunload offset module 124 generates the sunload offset as follows. The sunload offset module 124 receives the output signals generated by the sunload sensors 106 indicating the sunload on the driver and passenger sides of the dashboard. The sunload offset module 124 generates a sum of normalized values of the output signals, filters the sum, and generates a sunload sum.

The sunload offset module 124 includes memory and stores a sunload offset table for a predetermined RH in memory. An example of the sunload offset table for 50% RH is shown in the form of a graph of the sunload offset versus the sunload sum in FIG. 5A an in a table in FIG. 5B. The sunload offset module 124 generates the sunload offset corresponding to the sunload sum based on the sunload offset table. The sunload offset module 124 generates an output signal indicating the sunload offset.

Referring now to FIGS. 6A and 6B, the ambient temperature offset module 126 generates the ambient temperature offset as follows. The ambient temperature offset module 126 receives the output signal generated by the ambient temperature sensor 108 indicating the ambient temperature. Additionally, the ambient temperature offset module 126 receives the output signals generated by the user input module 101 indicating the driver and passenger setpoints. The ambient temperature offset module 126 generates a difference between the ambient temperature and a lower of the driver and passenger setpoints.

The ambient temperature offset module 126 includes memory and stores an ambient temperature offset table for a predetermined RH in memory. An example of the ambient temperature offset table for 50% RH is shown in the form of a graph of the ambient temperature offset versus the difference in FIG. 6A and in a table in FIG. 6B. The ambient temperature offset module 126 generates the ambient temperature offset corresponding to the difference based on the ambient temperature offset table. The ambient temperature offset module 126 generates an output signal indicating the ambient temperature offset.

Referring now to FIGS. 7A and 7B, the cabin dewpoint offset module 128 generates the cabin dewpoint offset as follows. The cabin dewpoint offset module 128 receives the output signal generated by the combination humidity sensor 102 indicating the actual dewpoint. Additionally, the cabin dewpoint offset module 128 receives the output signals generated by the infrared sensors 104 indicating the temperatures of the air on the driver and passenger sides of the cabin. The cabin dewpoint offset module 128 generates an average cabin temperature by averaging the temperatures. The cabin dewpoint offset module 128 generates a difference between the actual dewpoint and the average cabin temperature.

The cabin dewpoint offset module 128 includes memory and stores a cabin dewpoint offset table for a predetermined RH in memory. An example of the cabin dewpoint offset table for 50% RH is shown in the form of a graph of the cabin dewpoint offset versus the difference in FIG. 7A and in a table in FIG. 7B. The cabin dewpoint offset module 128 generates the cabin dewpoint offset corresponding to the difference based on the cabin dewpoint offset table. The cabin dewpoint offset module 128 generates an output signal indicating the cabin dewpoint offset.

Figures 8A, 8B:
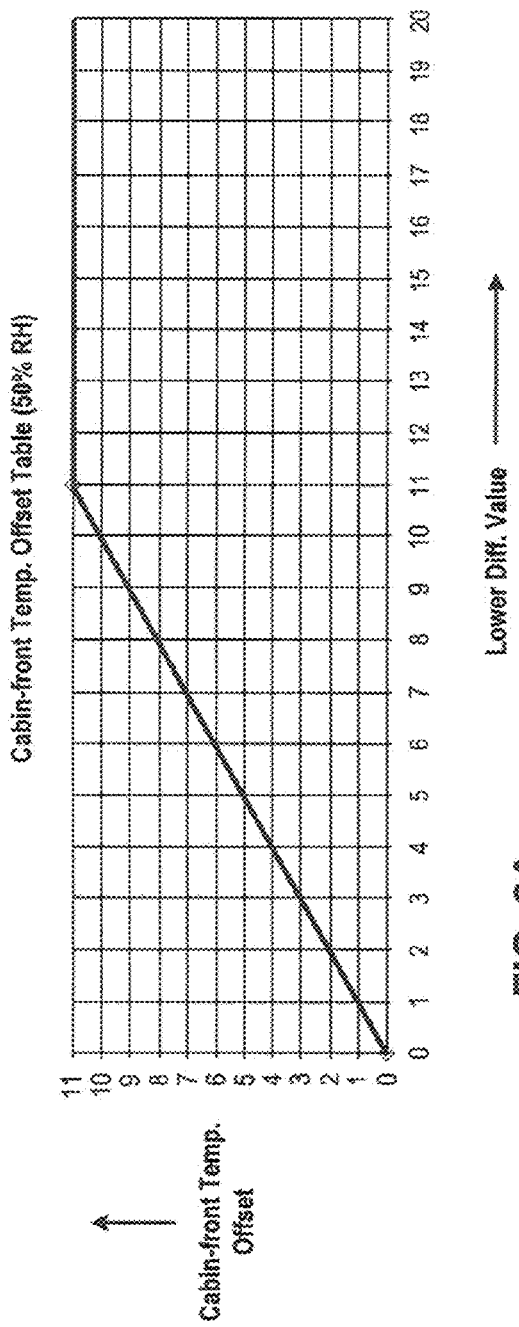
FIG. 8A is an exemplary graph of cabin-front temperature offset versus a lower difference value between actual dewpoint and average cabin temperature according to the present invention.
FIG. 8B is an exemplary cabin-front temperature offset table showing points of the graph of FIG. 8A according to the present invention.

Referring now to FIGS. 8A and 8B, the cabin-front temperature offset module 130 generates the cabin-front temperature offset as follows. The cabin-front temperature offset module 130 receives the output signals generated by the infrared sensors 104 indicating the temperatures of the air on the driver and passenger sides of the cabin-front. Additionally, the cabin-front temperature offset module 130 receives the output signals generated by the user input module 101 indicating the driver and passenger setpoints.

The cabin-front temperature offset module 130 generates a first difference between the temperature of the air on the driver side and the driver setpoint. The cabin-front temperature offset module 130 generates a second difference between the temperature of the air on the passenger side and the passenger setpoint. The cabin-front temperature offset module 130 selects a lower difference value of the first and second differences.

The cabin-front temperature offset module 130 includes memory and stores a cabin-front temperature offset table for a predetermined RH in memory. An example of the cabin-front temperature offset table for 50% RH is shown in the form of a graph of the cabin-front temperature offset versus the lower difference value in FIG. 8A and in a table in FIG. 8B. The cabin-front temperature offset module 130 generates the cabin-front temperature offset corresponding to the lower difference value based on the cabin-front temperature offset table. The cabin-front temperature offset module 130 generates an output signal indicating the cabin-front temperature offset.

The evaporator temperature control module 112 generates the sum by adding some or all of the offsets, subtracts the sum from the predetermined evaporator temperature, and generates the target evaporator temperature. For example, if the user dewpoint offset is 2, the sunload offset is 1, the ambient temperature offset is 1, the cabin dewpoint offset is 2, and the cabin-front temperature offset is 0, the sum of the offsets is 6. If the predetermined evaporator temperature is 52 F, the target evaporator temperature is (52 F−6)=46 F. Accordingly, the AC control module 116 adjusts the compressor 16 until the evaporator temperature reaches the target evaporator temperature of 46 F. If the sum of the offsets is zero, the AC control module 116 will turn the compressor 16 off until the sum of the offsets is non-zero again. The AC control module 116 does not keep the compressor 16 turned on until the evaporator temperature reaches the fixed low value of 38 F.

The ATC system 90 offers several benefits. Since the evaporator control system 100 measures the actual dewpoint and does not estimate the actual dewpoint, the evaporator control system 100 generates the target evaporator temperature precisely and accurately. Since the evaporator control system 100 generates the target evaporator temperature based on the actual and target dewpoints, the ATC system 90 ensures the comfort of the occupants while operating at the highest possible evaporator temperature.

Additionally, when the sum of the offsets is zero, the evaporator temperature generator module 112 generates a control signal. On receiving the control signal, the AC control module 116 can turn the compressor 16 off and blend fresh air from outside the vehicle into the cabin. Thus, the ATC system 90 decreases the energy consumption and increases the fuel efficiency of the vehicle without sacrificing the comfort of the occupants.

In some implementations, the AC control module 116 can set the target evaporator temperature and control the speed of the compressor 16 based on other factors in conjunction with the target evaporator temperature generated by the evaporator control system 100.

Figure 9:
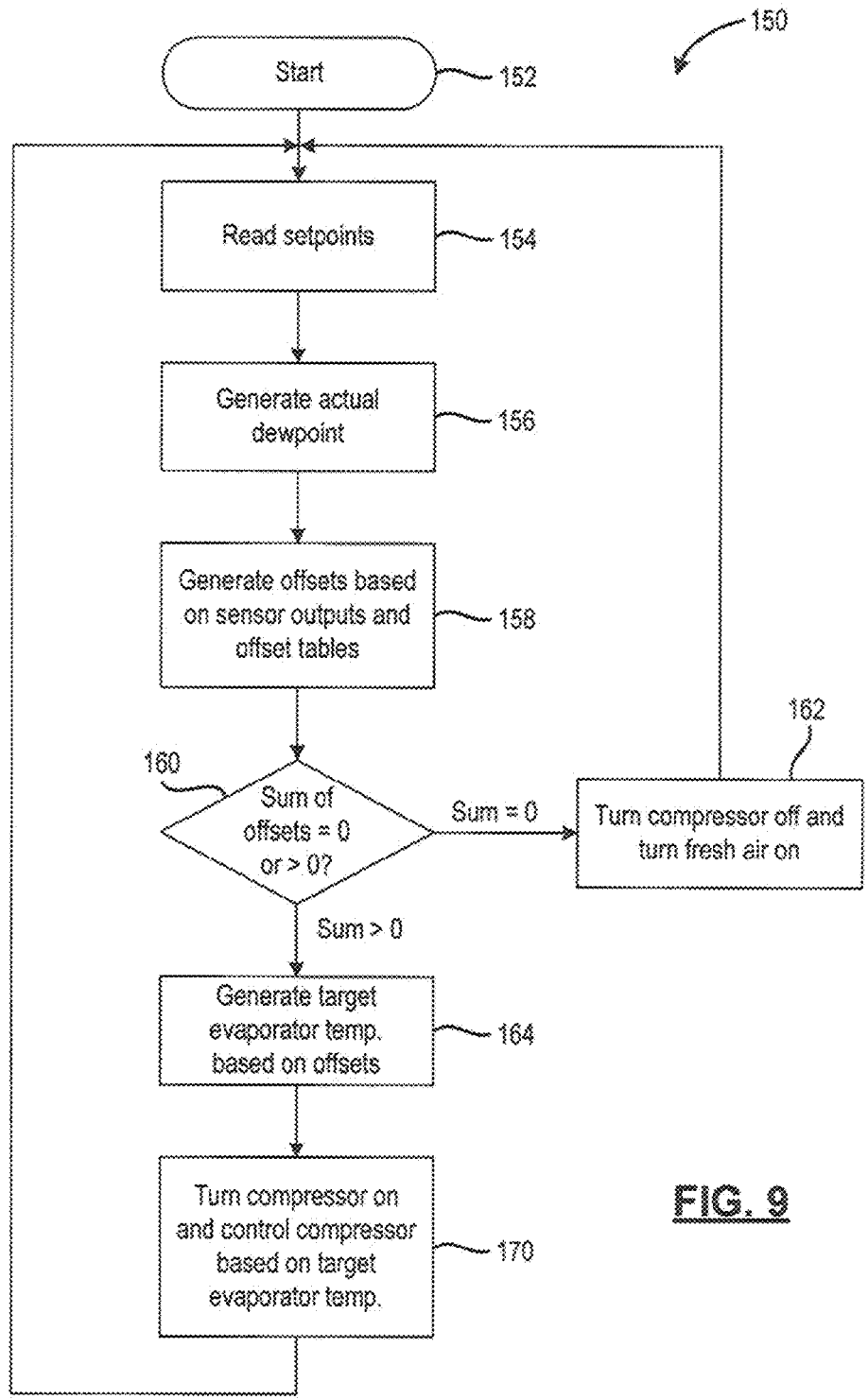
FIG. 9 is a flowchart of an exemplary method for generating a target evaporator temperature according to the present invention.

Referring now to FIG. 9, a method 150 for generating the target evaporator temperature according to the present invention is shown. The method 150 begins at step 152. The user input module 101 reads the setpoints in step 154. The combination humidity sensor 102 measures the windshield glass temperature, the windshield air temperature, and the RH of the air at the combination humidity sensor 102 and generates the actual dewpoint in step 156. In step 158, the offset generator module 110 generates offsets based on the setpoints, the actual dewpoint, the output signals generated by the sensors, the temperature table, and the offset tables.

In step 160, the evaporator temperature generator module 112 determines if the sum of the offsets is zero or greater than zero. When the sum of the offsets is zero, the evaporator temperature generator module 112 outputs the control signal to the AC control module 116 based on which the AC control module 116 turns the compressor 16 off and blends fresh air into the cabin in step 162. The method 150 returns to step 154.

When the sum of the sum of the offsets is greater than zero, the evaporator temperature generator module 112 generates the target evaporator temperature in step 164. In step 166, the AC control module 116 turns the compressor 16 on and controls the compressor 16 based on the target evaporator temperature in step 170. For example, the AC control module 116 turns the compressor 16 on and controls the speed of the compressor 16 to reach the target evaporator temperature. The method 150 returns to step 154.

Figure 10:
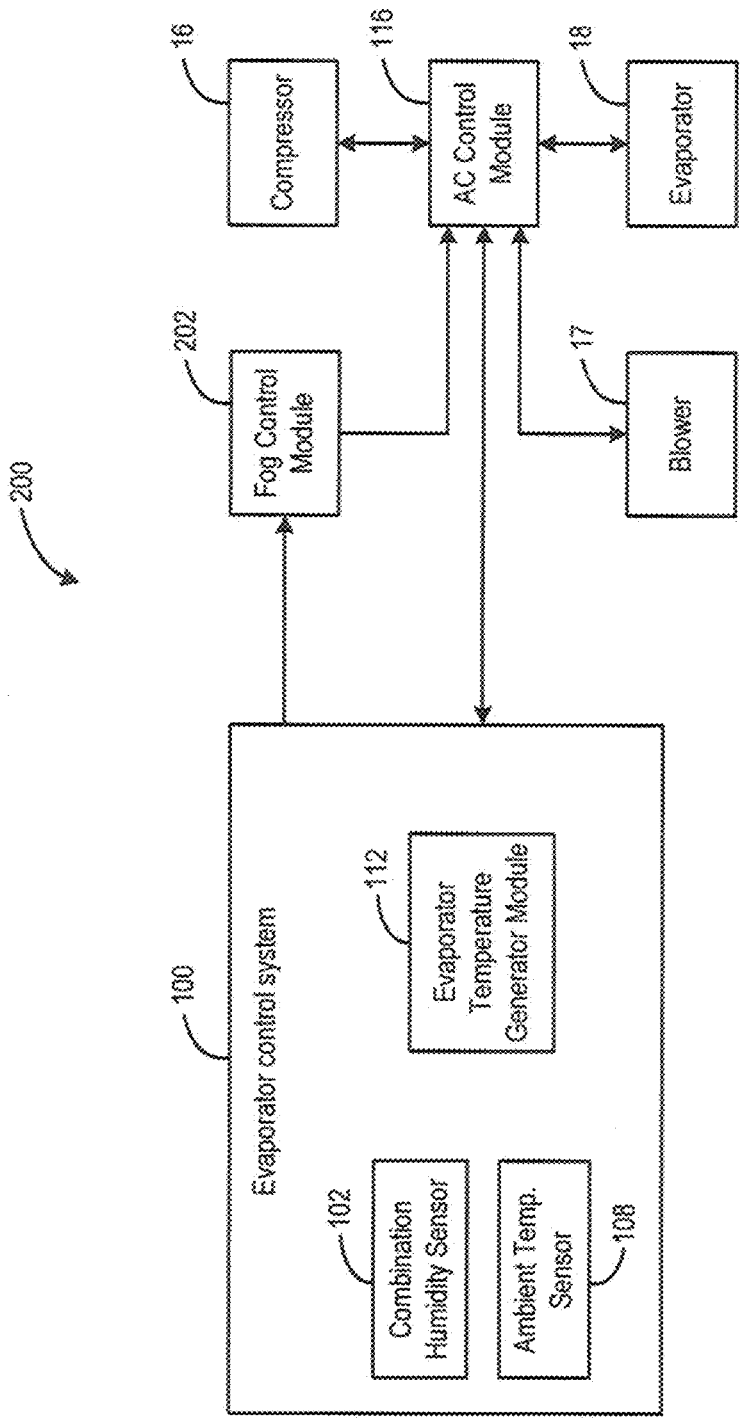
FIG. 10 is a functional block diagram of an exemplary defogging system according to the present invention.

Referring now to FIG. 10, a defogging system 200 that defogs the windshield according to the present invention is shown. Fogging occurs when the actual dewpoint of the air at the windshield is greater than the windshield glass temperature and approaches the windshield glass temperature. Defogging can be achieved by increasing a difference between the windshield glass temperature and the actual dewpoint. The difference is called Delta T and is given by the following equation.

Delta T=Windshield glass temperature−Actual Dewpoint

Delta T can be increased (i.e., defogging can be achieved) by decreasing the actual dewpoint. The actual dewpoint can be decreased by increasing the air temperature or by decreasing the RH of the air in the cabin. The defogging system 200 increases Delta T by decreasing the RH using AC as follows.

The defogging system 200 comprises the evaporator control system 100, a fog control module 202, the AC control module 116, the compressor 16, the blower 17, and the evaporator 18. The fog control module 202 communicates with the evaporator control system 100 and the AC control module 116. The fog control module 202 receives the windshield glass temperature and the actual dewpoint from the combination humidity sensor 102. The fog control module 202 generates Delta T.

When power is applied, the fog control module 202 determines if Delta T is greater than or equal to a first predetermined threshold (e.g., 6.1 C). If Delta T is greater than or equal to the first predetermined threshold, the fog control module 202 generates a control signal and outputs the control signal to the AC control module 116 indicating that defogging is unnecessary.

If, however, Delta T is less than or equal to a second predetermined threshold (e.g., 4 C), the fog control module 202 generates a control signal and outputs the control signal to the AC control module 116. On receiving the control signal, the AC control module 116 begins defogging as follows.

The AC control module 116 turns the compressor 16 on. The AC control module 116 receives the ambient temperature from the ambient temperature sensor 108. The AC control module 116 sets the target evaporator temperature to 38 F or 42 F when the ambient temperature is below or above 60 F, respectively. The AC control module 116 sets the airflow mode to mix mode (e.g., floor and defrost mode). The AC control module 116 turns recirculation off and fresh air on. The AC control module 116 turns the blower 17 on and sets the blower speed to a predetermined speed. The actual dewpoint begins to decrease, and Delta T begins to increase.

As Delta T increases, the fog control module 202 compares Delta T to a plurality of predetermined thresholds. For example, the fog control module 202 determines if Delta T≦5 C, Delta T≦6 C, and so on. The fog control module 202 generates control signals indicating the values of Delta T relative to the predetermined thresholds.

Alternatively, when power is applied, if Delta is not greater than or equal to the first predetermined threshold and not less than or equal to the second predetermined threshold (e.g., 4 C≦Delta T≦6 C), the fog control module 202 determines if Delta T is less than or equal to the plurality of predetermined thresholds. For example, the fog control module 202 determines if Delta T≦4.3 C, Delta T≦5 C, and so on. The fog control module 202 generates control signals indicating the values of Delta T relative to the respective predetermined thresholds.

Based on the control signals (i.e., depending on the values of Delta T), the AC control module 116 performs one or more of the following functions to complete defogging. The AC control module 116 turns the compressor 16 on. The AC control module 116 uses the target evaporator temperature generated by the evaporator control system 100 or sets the target evaporator temperature to 38 F or 42 F when the ambient temperature is below or above 60 F. The AC control module 116 sets the airflow mode to mix mode (e.g., floor and defrost mode). The AC control module 116 turns recirculation off and fresh air on. The AC control module 116 turns the blower 17 on and sets the blower speed to the predetermined speed.

When Delta T is greater than or equal to a third predetermined threshold (e.g., 8 C), the fog control module 202 generates a control signal and outputs the control signal to the AC control module 116 indicating that the defogging is complete. The AC control module 116 stops the functions relative to defogging.

Figure 11:
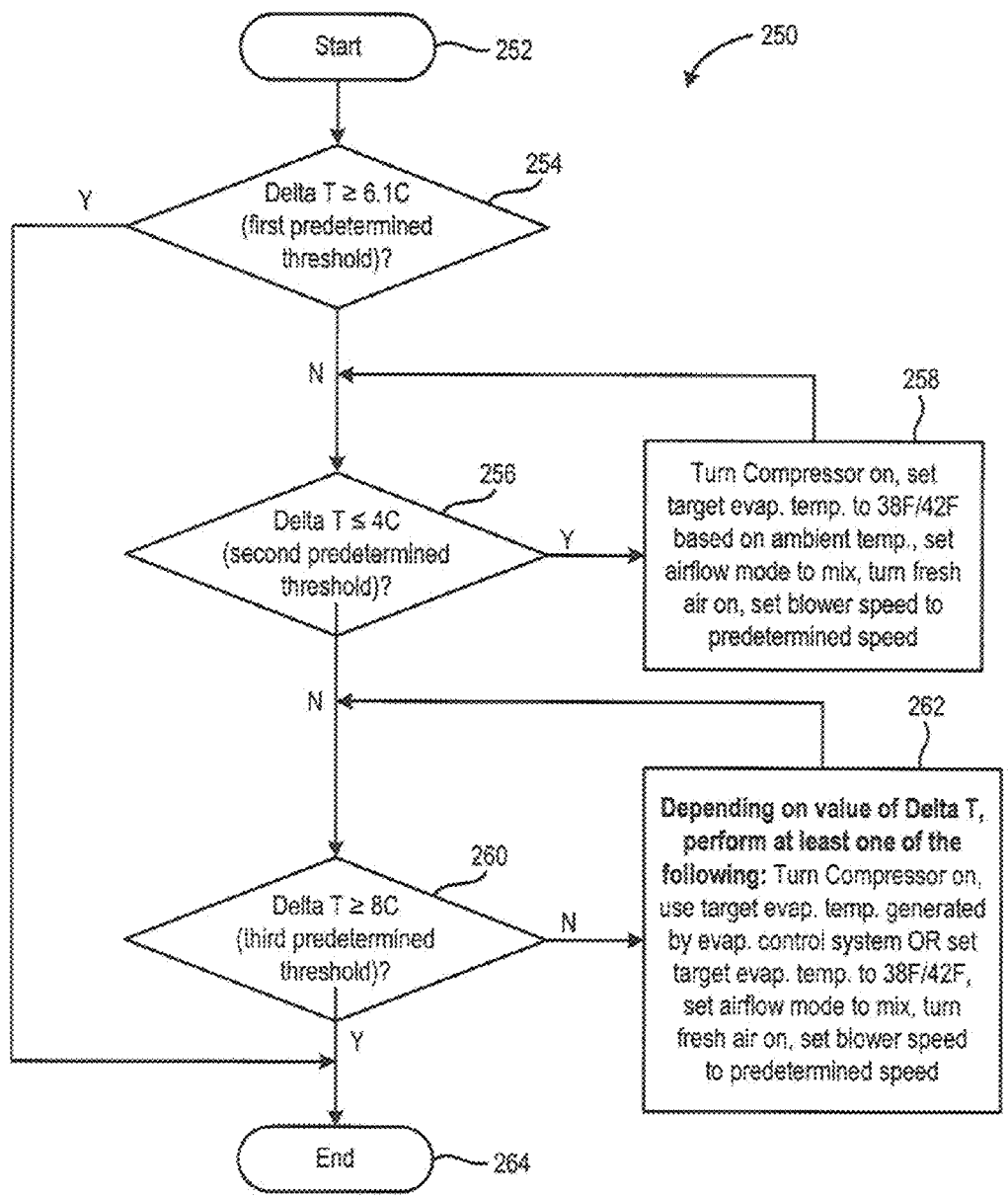
FIG. 11 is a flowchart of an exemplary method for defogging a windshield of a vehicle according to the present invention.

Referring now to FIG. 11, a method 250 for defogging the windshield according to the present invention is shown. The method 250 begins at step 252. The fog control module 202 determines in step 254 if Delta T is greater than or equal to the first predetermined threshold (e.g., 6.1 C). If the result of step 254 is true, the method 250 ends in step 264. If the result of step 254 is false, the fog control module 202 determines in step 256 if Delta T is less than or equal to the second predetermined threshold (e.g., 4 C).

If the result of step 256 is true, the AC control module 116 performs the following functions in step 258. The AC control module 116 turns the compressor 16 on, sets the target evaporator temperature to 38 F or 42 F when the ambient temperature is below or above 60 F, sets the airflow mode to mix mode (e.g., floor and defrost mode), turns recirculation off and fresh air on, turns the blower 17 on, and sets the blower speed to the predetermined speed. The method 250 repeats step 256.

If the result of step 256 is false, the fog control module 202 determines in step 260 if Delta T is greater than or equal to the third predetermined threshold (e.g., 8 C). If the result of step 260 is false, the AC control module 116 performs one or more of the following functions in step 262. The AC control module 116 turns the compressor 16 on, uses the target evaporator temperature generated by the evaporator control system 100 or sets the target evaporator temperature to 38 F or 42 F when the ambient temperature is below or above 60 F, sets the airflow mode to mix mode (e.g., floor and defrost mode), turns recirculation off and fresh air on, turns the blower 17 on, and sets the blower speed to the predetermined speed. The method 250 repeats step 260. If the result of step 260 is true, the method 250 ends in step 264.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A system for controlling air-conditioning of a vehicle, comprising:
    an input that receives an input temperature;
    a sensor that measures relevant values and calculates a first dewpoint temperature of air adjacent to a windshield of said vehicle;
    a first offset module that generates a second dewpoint temperature based on said input temperature and that generates a first offset representing a difference between said first and second dewpoint temperatures; and
    an evaporator temperature control module that generates a target evaporator temperature by offsetting a predetermined evaporator temperature by said first offset.

2. The system of claim 1 wherein said sensor generates said first dewpoint temperature by measuring a temperature and a relative humidity (RH) of said air adjacent to said windshield and a glass temperature of said windshield.

3. The system of claim 1 wherein said first offset module generates said second dewpoint temperature based on a predetermined relative humidity (RH).

4. The system of claim 3 further comprising:
    a second offset module that generates a second offset at said predetermined RH based on a difference between an ambient temperature outside said vehicle and said input temperature;
    a third offset module that generates a third offset at said predetermined RH based on a sunload inside said vehicle;
    a fourth offset module that generates a fourth offset at said predetermined RH based on a difference between said first dewpoint temperature and a temperature inside said vehicle; and
    a fifth offset module that generates a fifth offset at said predetermined RH based on a difference between said input temperature and said temperature inside said vehicle,
    wherein said evaporator temperature control module generates said target evaporator temperature by subtracting a sum of said first offset and at least one of said second, third, fourth, and fifth offsets from said predetermined evaporator temperature.

5. The system of claim 4 wherein said predetermined RH includes RH between 45% and 55%, said predetermined evaporator temperature includes a temperature of 52 F, and wherein said target evaporator temperature includes a temperature between 38 F and 52 F.

6. The system of claim 4 further comprising an air-conditioning (AC) control module that controls at least one of a compressor, a blower, and a mode of airflow inside said vehicle based on said target evaporator temperature, wherein said AC control module turns off said compressor when one of said sum is zero and a temperature of said evaporator is substantially equal to said target evaporator temperature.

7. The system of claim 6 further comprising a fog control module that controls defogging of said windshield based on said first dewpoint temperature and a glass temperature of said windshield measured by said sensor, and that generates a difference between said first dewpoint temperature and said glass temperature, wherein said AC control module:
    does not turn on said compressor when said difference is greater than or equal to a first threshold temperature; and
    turns on said compressor when said difference is less than or equal to a second threshold temperature.

8. The system of claim 7 wherein said first threshold temperature includes a temperature of 6.1 degrees Celsius, and wherein said second threshold temperature includes a temperature of 4 degrees Celsius.

9. The system of claim 7 wherein when a difference between said first dewpoint temperature and said glass temperature is between third and fourth thresholds, said AC control module controls at least one of said compressor, said blower, and said mode of airflow by generating said target evaporator temperature based on said ambient temperature.

10. The system of claim 9 wherein said third and fourth thresholds include 4 and 8 degrees Celsius, respectively.

11. A method for controlling air-conditioning of a vehicle, comprising:
receiving an input temperature;
measuring relevant values and calculating a first dewpoint temperature of air adjacent to a windshield of said vehicle using a sensor;
generating a second dewpoint temperature based on said input temperature;
generating a first offset representing a difference between said first and second dewpoint temperatures; and
generating a target evaporator temperature by offsetting a predetermined evaporator temperature by said first offset.

12. The method of claim 11 further comprising generating said first dewpoint temperature by measuring a temperature and a relative humidity (RH) of said air adjacent to said windshield and a glass temperature of said windshield using said sensor.

13. The method of claim 11 further comprising:
generating said second dewpoint temperature based on a predetermined relative humidity (RH).

14. The method of claim 13 further comprising:
generating a second offset at said predetermined RH based on a difference between an ambient temperature outside said vehicle and said input temperature;
generating a third offset at said predetermined RH based on a sunload inside said vehicle;
generating a fourth offset at said predetermined RH based on a difference between said first dewpoint temperature and a temperature inside said vehicle;
generating a fifth offset at said predetermined RH based on a difference between said input temperature and said temperature inside said vehicle; and
generating said target evaporator temperature by subtracting a sum of said first offset and at least one of said second, third, fourth, and fifth offsets from said predetermined evaporator temperature.

15. The method of claim 14 wherein said predetermined RH includes RH between 45% and 55%, said predetermined evaporator temperature includes a temperature of 52 F, and wherein said target evaporator temperature includes a temperature between 38 F and 52 F.

16. The method of claim 14 further comprising:
controlling at least one of a compressor, a blower, and a mode of airflow inside said vehicle based on said target evaporator temperature; and
turning off said compressor when one of said sum is zero and a temperature of said evaporator is substantially equal to said target evaporator temperature.

17. The method of claim 16 further comprising:
controlling defogging of said windshield based on said first dewpoint temperature and a glass temperature of said windshield measured by said sensor;
generating a difference between said first dewpoint temperature and said glass temperature;
not turning on said compressor when said difference is greater than or equal to a first threshold temperature; and
turning on said compressor when said difference is less than or equal to a second threshold temperature.

18. The method of claim 17 wherein said first threshold temperature includes a temperature of 6.1 degrees Celsius, and wherein said second threshold temperature includes a temperature of 4 degrees Celsius.

19. The method of claim 17 further comprising, when a difference between said first dewpoint temperature and said glass temperature is between third and fourth thresholds, controlling at least one of said compressor, said blower, and said mode of airflow by generating said target evaporator temperature based on said ambient temperature.

20. The method of claim 19 wherein said third and fourth thresholds include 4 and 8 degrees Celsius, respectively.

* * * * *